United States Patent
Wang et al.

(10) Patent No.: US 10,423,882 B2
(45) Date of Patent: Sep. 24, 2019

(54) DISK CAPACITY PREDICTING METHOD, APPARATUS, EQUIPMENT AND NON-VOLATILE COMPUTER STORAGE MEDIUM

(71) Applicant: Beijing Baidu Netcom Science and Technology Co., Ltd., Beijing (CN)

(72) Inventors: Bo Wang, Beijing (CN); Xianping Qu, Beijing (CN); Jia He, Beijing (CN); Shimin Tao, Beijing (CN); Zhi Zang, Beijing (CN); Beibei Miao, Beijing (CN); Yu Chen, Beijing (CN); Hui Su, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 634 days.

(21) Appl. No.: 15/039,780

(22) PCT Filed: Nov. 10, 2015

(86) PCT No.: PCT/CN2015/094203
§ 371 (c)(1),
(2) Date: May 26, 2016

(87) PCT Pub. No.: WO2017/031837
PCT Pub. Date: Mar. 2, 2017

(65) Prior Publication Data
US 2017/0193373 A1    Jul. 6, 2017

(30) Foreign Application Priority Data
Aug. 25, 2015  (CN) .......................... 2015 1 0524920

(51) Int. Cl.
*G06F 3/06*    (2006.01)
*G06N 5/04*    (2006.01)
*G06F 16/00*   (2019.01)

(52) U.S. Cl.
CPC ............. *G06N 5/04* (2013.01); *G06F 3/0604* (2013.01); *G06F 3/0638* (2013.01);
(Continued)

(58) Field of Classification Search
CPC ......... G06N 5/04; G06F 16/00; G06F 3/0604; G06F 3/0638; G06F 3/0653; G06F 3/0674
See application file for complete search history.

(56) References Cited

U.S. PATENT DOCUMENTS 8,688,927 B1 * 4/2014 Chamness ............... G06F 12/02
                                                711/154
2010/0070319 A1 * 3/2010 Prafullchandra ...... G06Q 10/06
                                                726/22

(Continued)

FOREIGN PATENT DOCUMENTS

CN   101364229 A   2/2009
CN   103810244 A   5/2014
(Continued)

OTHER PUBLICATIONS

Extended European Search Report, dated Apr. 1, 2019, for European Application No. 15859994.4-1221/3343376, 7 pages.
(Continued)

*Primary Examiner* — Austin Hicks
(74) *Attorney, Agent, or Firm* — Seed IP Law Group LLP (57) ABSTRACT

Embodiments of the present disclosure provide a disk capacity predicting method, apparatus, equipment and non-volatile computer storage medium. On the one hand, the change data of the disk capacity is obtained according to the historical capacity data of the disk; then the target inflection point in the historical capacity data is obtained according to the change data of the disk capacity; and then the linear relationship between the time and disk capacity is obtained (Continued)

according to the historical capacity data after the target inflection point. Therefore, technical solutions provided by embodiments of the present disclosure may achieve improvement of accuracy of prediction of disk capacity trend and reduce the cost needed in disk capacity prediction.

12 Claims, 2 Drawing Sheets

(52) U.S. Cl.
CPC .......... *G06F 3/0653* (2013.01); *G06F 3/0674* (2013.01); *G06F 16/00* (2019.01)

(56) References Cited

U.S. PATENT DOCUMENTS

| | | |
|---|---|---|
| 2010/0250748 A1 | 9/2010 | Sivasubramanian et al. |
| 2018/0196891 A1 | 7/2018 | Miao et al. |

FOREIGN PATENT DOCUMENTS

| | | |
|---|---|---|
| CN | 103903069 A | 7/2014 |
| CN | 103970641 A | 8/2014 |
| CN | 104809333 A | 7/2015 |

OTHER PUBLICATIONS

Chinese Search Report, dated Aug. 25, 2015, for Chinese Application No. 201510524920.8, 1 page.

Chinese Office Action, dated Jul. 25, 2017, for Chinese Application No. 201510524920.8, 17 pages (with English Translation).

Chinese Notice of Allowance, dated Mar. 16, 2018, for Chinese Application No. 201510524920.8, 1 page.

\* cited by examiner

DISK CAPACITY PREDICTING METHOD, APPARATUS, EQUIPMENT AND NON-VOLATILE COMPUTER STORAGE MEDIUM

CROSS-REFERENCES TO RELATED APPLICATIONS

The present disclosure claims priority to the Chinese patent application No. 201510524920.8 entitled "Disk Capacity Predicting Method and Apparatus" filed on Aug. 25, 2015, the entire disclosure of which is hereby incorporated by reference in its entirety.

FIELD OF THE DISCLOSURE

The present disclosure relates to the technical field of computers, and particularly to a disk capacity predicting method, apparatus, equipment and non-volatile computer storage medium.

BACKGROUND OF THE DISCLOSURE

Internet suppliers at home and abroad all concern overall disk capacity of their own service cluster. Through the concern of the disk capacity, the disk capacity may be increased or decreased at proper time, thereby saving a lot of costs and bringing about huge economic benefits.

In the prior art, a threshold value is preset for the disk capacity of the cluster. After the disk capacity reaches the threshold value, the number of increased machines is predicted manually and increased manually. However, since this disk capacity expansion manner requires manual prediction and increase, it consumes greater manpower cost. Furthermore, as an accuracy of manually-predicted disk capacity trend is lower, the disk capacity after the increase cannot meet the need or becomes redundant and thereby causes waste.

SUMMARY OF THE DISCLOSURE

In view of the above, embodiments of the present disclosure provide a disk capacity predicting method, apparatus, equipment and non-volatile computer storage medium, which achieves improvement of accuracy of prediction of disk capacity trend, and reduces the cost needed in disk capacity prediction.

According to an aspect of embodiments of the present disclosure, there is provided a disk capacity predicting method, comprising:

obtaining change data of a disk capacity according to historical capacity data of the disk;

obtaining a target inflection point in the historical capacity data according to the change data of the disk capacity;

obtaining a linear relationship between time and the disk capacity according to the historical capacity data after the target inflection point.

The aforesaid aspect and any possible implementation mode may further provide an implementation mode: before obtaining change data of a disk capacity according to historical capacity data of the disk, the method further comprises:

performing data smoothing processing for the historical capacity data of the disk.

The aforesaid aspect and any possible implementation mode may further provide an implementation mode: the historical capacity data comprise at least one sampling moment and a disk capacity at each sampling moment; the obtaining the change data of a disk capacity according to historical capacity data of the disk comprises:

obtaining a disk capacity speed at each sampling moment in said at least on sampling moment according to the disk capacity at said at least one sampling moment, as the change data of the disk capacity; or obtaining a disk capacity acceleration at each sampling moment in said at least on sampling moment according to the disk capacity at said at least one sampling moment, as the change data of the disk capacity.

The aforesaid aspect and any possible implementation mode may further provide an implementation mode: the obtaining a target inflection point in the historical capacity data according to the change data of the disk capacity comprises:

using at least two detection algorithms to respectively detect the change data of the disk capacity, to obtain a first candidate inflection point detected by each detection algorithm;

obtaining a target inflection point in the historical capacity data according to the first candidate inflection point detected by each detection algorithm.

The aforesaid aspect and any possible implementation mode may further provide an implementation mode: the obtaining a target inflection point in the historical capacity data according to the first candidate inflection point detected by each detection algorithm comprises:

obtaining a second inflection point according to the first candidate inflection point detected by each detection algorithm, obtaining the second candidate inflection point at the latest sampling moment as a target inflection point in the historical capacity data.

The aforesaid aspect and any possible implementation mode may further provide an implementation mode: the obtaining a linear relationship between time and the disk capacity according to the historical capacity data after the target inflection point comprises:

performing linear fitting processing for the historical capacity data after the target inflection point to obtain the linear relationship between the time and disk capacity.

According to another aspect of embodiments of the present disclosure, there is provided a disk capacity predicting apparatus, comprising:

a data processing unit configured to obtain change data of a disk capacity according to historical capacity data of the disk;

an inflection point recognizing unit configured to obtain a target inflection point in the historical capacity data according to the change data of the disk capacity;

a capacity predicting unit configured to obtain a linear relationship between time and the disk capacity according to the historical capacity data after the target inflection point.

The aforesaid aspect and any possible implementation mode may further provide an implementation mode: the apparatus further comprises:

a data smoothing unit configured to perform data smoothing processing for the historical capacity data of the disk.

The aforesaid aspect and any possible implementation mode may further provide an implementation mode: the historical capacity data comprise at least one sampling moment and a disk capacity at each sampling moment; the data processing unit is specifically configured to:

obtain a disk capacity speed at each sampling moment in said at least on sampling moment according to the disk capacity at said at least one sampling moment, as the change data of the disk capacity; or obtain a disk capacity acceleration at each sampling moment in said at least on sampling moment according to the disk capacity at said at least one sampling moment, as the change data of the disk capacity.

The aforesaid aspect and any possible implementation mode may further provide an implementation mode: the inflection point recognizing unit is specifically configured to:

use at least two detection algorithms to respectively detect the change data of the disk capacity, to obtain a first candidate inflection point detected by each detection algorithm;

obtain a target inflection point in the historical capacity data according to the first candidate inflection point detected by each detection algorithm.

The aforesaid aspect and any possible implementation mode may further provide an implementation mode: upon obtaining a target inflection point in the historical capacity data according to the first candidate inflection point detected by each detection algorithm, said inflection point recognizing unit is specifically configured to:

obtain a second inflection point according to the first candidate inflection point detected by each detection algorithm, obtain the second candidate inflection point at the latest sampling moment as a target inflection point in the historical capacity data.

The aforesaid aspect and any possible implementation mode may further provide an implementation mode: the capacity predicting unit is specifically configured to: perform linear fitting processing for the historical capacity data after the target inflection point to obtain the linear relationship between the time and disk capacity.

According to a further aspect of the present disclosure, there is provided an apparatus, comprising:

one or more processors;

a memory;

one or more programs stored in the memory, and configured to, when being executed by said one or more processors, obtain change data of a disk capacity according to historical capacity data of the disk;

obtain a target inflection point in the historical capacity data according to the change data of the disk capacity;

obtain a linear relationship between time and the disk capacity according to the historical capacity data after the target inflection point.

According to a further aspect of the present disclosure, there is provided a non-volatile computer storage medium which stores one or more programs, and which enables, when said one or more programs being executed by an device, the apparatus to:

obtain change data of a disk capacity according to historical capacity data of the disk;

obtain a target inflection point in the historical capacity data according to the change data of the disk capacity;

obtain a linear relationship between time and the disk capacity according to the historical capacity data after the target inflection point.

As can be seen from the above technical solutions, embodiments of the present disclosure may have the following advantageous effects:

In the embodiments of the present disclosure, the embodiments of the present disclosure may have the following advantageous effects:

Technical solutions provided by embodiments of the present disclosure can automatically predict the trend of the disk capacity according to the historical capacity data of the disk. As compared with manual prediction of disk capacity trend in the prior art, technical solutions provided by embodiments of the present disclosure may achieve improvement of accuracy of prediction of disk capacity trend, thereby avoiding problems to the effect that the disk capacity, after capacity being increased, cannot satisfy the demand, or redundancy and waste of the disk capacity is caused after the capacity is increased, and thereby reducing manpower cost needed in disk capacity prediction.

BRIEF DESCRIPTION OF DRAWINGS

To describe technical solutions of embodiments of the present disclosure more clearly, figures to be used in the embodiments will be described briefly. Obviously, the figures described below are only some embodiments of the present disclosure. Those having ordinary skill in the art appreciate that other figures may be obtained from these figures.

DETAILED DESCRIPTION OF PREFERRED EMBODIMENTS

Embodiments of the present disclosure will be described in detail to make technical solutions of the present disclosure more apparent.

It should be appreciated that embodiments described here are only partial embodiments of the present disclosure, not all embodiments. Based on embodiments in the present disclosure, all other embodiments obtained by those having ordinary skill in the art fall within the protection scope of the present disclosure.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

It should be appreciated that although terms such as the first and the second might be used in embodiments of the present disclosure to describe a candidate inflection point, but these key words should not be limited to these terms. These terms are only used to distinguish candidate inflection points from one another. For example, without departing from the scope of the embodiments of the present disclosure, the first candidate inflection point may be called the second candidate inflection point, and similarly, the second candidate inflection point may also be called the first candidate inflection point.

Depending on the context, the word "if" as used herein may be construed as "at the time when . . . " or "when . . . " or "responsive to determination" or "responsive to detection". Similarly, depending on the context, phrases "if . . . is determined" or "if . . . is detected (stated condition or event)" may be construed as "when . . . is determined" or "responsive to determination" or "when . . . is detected (stated condition or event)" or "responsive to detection (stated condition or event)".

Figure 1:
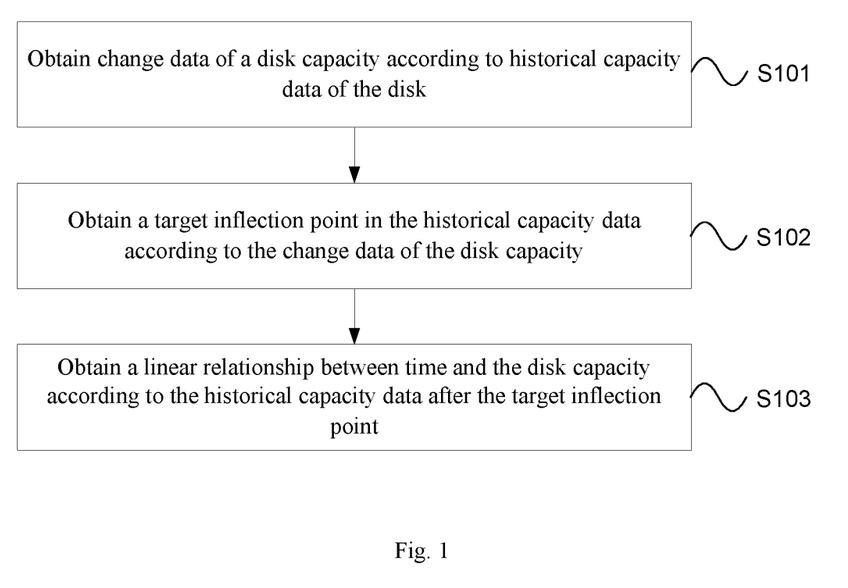
FIG. 1 is a flow chart of a disk capacity predicting method according to an embodiment of the present disclosure.

An embodiment of the present disclosure provides a disk capacity predicting method. Referring to FIG. 1, it is a flow chart of a disk capacity predicting method according to an embodiment of the present disclosure. As shown in the figure, the method comprises the following steps:

S101: obtaining change data of a disk capacity according to historical capacity data of the disk;

S102: obtaining a target inflection point in the historical capacity data according to the change data of the disk capacity;

S103: obtaining a linear relationship between time and the disk capacity according to the historical capacity data after the target inflection point.

Optionally, in a possible implementation mode of the embodiment of the present disclosure, the historical capacity data of the disk may be acquired in advance, then the historical capacity data of the disk are recorded, and finally the recorded historical capacity data of the disk are stored. As such, when the disk capacity needs to be predicted, the pre-stored historical capacity data of the disk may be read.

In a specific implementation procedure, the historical capacity data of the disk may be acquired at a preset time interval. The time interval may be fixed or non-fixed. Hence, the time interval for acquiring the historical capacity data of the disk each time may be the same or different, which is not specifically limited in the embodiment of the present disclosure.

In a specific implementation procedure, the historical capacity data of the disk may comprise at least one sampling moment and a disk capacity at each sampling moment.

It is appreciated that the sampling moment refers to a moment for acquiring the historical capacity data of the disk. The disk capacity at each sampling moment may be surplus capacity of the disk or already-used capacity of the disk.

For example, the historical capacity data of the disk may be acquired one time at an interval of 10 minutes, the time interval for acquiring each time is fixed, and the acquired disk capacity may be already-used capacity of the disk.

Optionally, the disk capacity may comprise but not limited to a disk capacity of a cluster.

Optionally, the cluster may comprise at least two servers.

Optionally, the disk capacity of the cluster refers to a total disk capacity of at least two servers.

For example, the cluster may be a cloud storage cluster.

Optionally, in a possible implementation mode of the embodiment of the present disclosure, before obtaining change data of a disk capacity according to historical capacity data of the disk in S101, the method may comprise performing data smoothing processing for the historical capacity data of the disk in advance.

In a specific implementation procedure, when the disk capacity needs to be predicted, the pre-stored historical capacity data of the disk may be read first, then the read historical capacity data of the disk is subjected to data smoothing processing, and thereby the change data of the disk capacity is obtained according to the historical capacity data of the disk after the data smoothing processing.

In a specific implementation procedure, data smoothing processing may be performed for the read historical capacity data of the disk by using, but not limited to moving average algorithm or moving median algorithm. A purpose of performing data smoothing processing for the historical capacity data of the disk is to remove data noise from the historical capacity data. The embodiment of the present disclosure does not especially limit the algorithm used for the data smoothing processing.

As may be appreciated, if data written into the disk in the cluster is of good quality, generally there is less data noise in the historical capacity data of the disk. Therefore, it is also possible not to perform the data smooth processing for the historical capacity data of the disk. On the contrary, if the data written into the disk in the cluster is of poor quality, generally there is more data noise in the historical capacity data of the disk, so it is necessary to perform the data smooth processing for the historical capacity data of the disk.

By way of example, the method of using the moving median algorithm to perform the data smooth processing for the read historical capacity data of the disk may comprise but not limited to:

First, defining a slide window with a length L, wherein L=2N+1, namely L is an odd number, to ensure the number of data entering the slide window is an odd number. When the slide window with a length L is used to perform the data smooth processing for the historical capacity data of the disk, partial historical capacity data in the read historical capacity data of the disk are placed in the slide window so that the slide window includes historical capacity data $X(i-N), \ldots, X(i), \ldots, X(i+N)$. Then, the historical capacity data in the slide window are sorted in a descending order of the magnitude of disk capacity therein, a median value $X(i)$ is obtained according to a sorting result, and the historical capacity data corresponding to the median value $X(i)$ is output as a data smoothing result. Then, the slide window slides, so that another portion of historical capacity data are placed in the slide window, and the above operations are repeated. The procedure is repeated in this way, and a median value in the slide window may be obtained each time, and the processing stops until the slide window has already moved to a distal end of the read historical capacity data of the disk. As such, the historical capacity data corresponding to the median value in the slide window each time is aggregated to obtain a final data smoothing result, and the remaining historical capacity data are filtered away as data noise.

Noticeably, a value of the length L of the slide window may be determined according to the number of data noise in the historical capacity data of the disk. If there is more data noise in the historical capacity data of the disk, the value of the length L of the slide window may increase; if there is less data noise in the historical capacity data of the disk, the value of the length L of the slide window may decrease.

In a specific implementation procedure, the change data of the disk capacity may be obtained according to the historical capacity data after the data smoothing processing by using but not limited to algorithms such as data derivation algorithm or Kalman filtering algorithm. The embodiment of the present disclosure does not particularly limit the algorithm used to obtain the change data of the disk capacity.

By way of an example, the method of obtaining the change data of the disk capacity according to the historical capacity data after the data smoothing processing by using data derivation algorithm may comprise but not limited to:

The historical capacity data after the data smoothing processing may contain at least one sampling moment and a disk capacity at each sampling moment. Therefore, a disk capacity speed at each sampling moment in said at least on sampling moment may be obtained according to the disk capacity at said at least one sampling moment, as the change data of the disk capacity. Alternatively, a disk capacity acceleration at each sampling moment in said at least on sampling moment may be obtained according to the disk capacity at said at least one sampling moment, as the change data of the disk capacity.

In a specific implementation procedure, the historical capacity data of the disk after the data smoothing processing are sorted in a temporal sequential order according to the sampling moments in the historical capacity data of the disk, to obtain a sorting result. Then, as for each sampling moment in the sorting result, the disk capacity acceleration at this sampling moment or disk capacity speed at this sampling moment is calculated in turn, as the change data of the disk capacity.

In a specific implementation procedure, a disk capacity speed v at a sampling moment t may be a disk capacity at a sampling moment t+1 minus a disk capacity at a sampling moment t, then a differential value of the two disk capacities is divided by a time interval between the sampling moment t+1 and the sampling moment t. Alternatively, the disk capacity speed v at the sampling moment t is divided by the time interval between the sampling moment t+1 and the sampling moment t, to obtain a disk capacity acceleration a at the sampling moment t.

In a specific implementation procedure, after the change data of the disk capacity is obtained, a target inflection point in the historical capacity data may be further obtained according to the change data of the disk capacity.

By way of an example, the method of obtaining a target inflection point in the historical capacity data according to the change data of the disk capacity may comprise but not limited to:

First, using at least two detection algorithms to respectively detect the change data of the disk capacity, to obtain a first candidate inflection point detected by each detection algorithm. Then, a target inflection point in the historical capacity data is obtained according to the first candidate inflection point detected by each detection algorithm.

In a specific implementation procedure, said at least two detection algorithms may comprise but not limited to at least two among T detection algorithm, variance detection algorithm, and variance analysis detection algorithm, and they may comprise other detection algorithms. This is not limited in the embodiment of the present disclosure.

For example, if the change data of the disk capacity contains at least one sampling moment and a disk capacity speed at each sampling moment, the method of using the T detection algorithm to detect the change data of the disk capacity to obtain the first candidate inflection point may comprise but not limited to:

In the T detection algorithm, it is believed that change data profiles of the disk capacity before and after the inflection point are different. Hence, the T detection algorithm may be used to detect, among the change data of the disk capacity, whether a speed profile of other sampling moments preceding the sampling moment are consistent with a speed profile of other sampling moments after the sampling moment. If they are consistent, it is determined that the sampling moment is not the first candidate inflection point. On the contrary, if they are not consistent, it is determined that the sampling moment is the first candidate inflection point, thereby implementing obtainment of the first candidate inflection point.

For example, the change data of the disk capacity contain sampling moment 1 to sampling moment 7 and a disk capacity speed at each sampling moment. Regarding sampling moment 4, a speed profile before the sampling moment 4 is obtained according to the disk capacity speed of each sampling moment in sampling moment 1 to sampling moment 3. A speed profile after the sampling moment 4 is obtained according to the disk capacity speed of each sampling moment in sampling moment 5 to sampling moment 7. The two speed profiles are compared to see whether they are consistent. If they are consistent, it is determined that the sampling moment 4 is not the first candidate inflection point. On the contrary, if they are not consistent, it is determined that the sampling moment 4 is the first candidate inflection point.

For example, it the change data of the disk capacity contain at least one sampling moment and a disk capacity speed at each sampling moment, the method of using the variance detection algorithm to detect the change data of the disk capacity to obtain the first candidate inflection point may comprise but not limited to:

First, an average value and a variance of the disk capacity speed is calculated according to disk capacity speeds at all sampling moments in the change data of the disk capacity. Then, according to disk capacity data at all sampling moments in the change data of the disk capacity, disk capacity data therein that is greater than (average value+N×variance) and disk capacity data therein that is less than (average−N×variance) are obtained, and a sampling moment corresponding to the disk capacity data that is greater than (average value+N×variance) and a sampling moment corresponding to the disk capacity data that is less than (average value−N×variance) are considered as the first candidate inflection points. Finally, the determined first candidate inflection points are removed from the change data of the disk capacity, then the above detection operation is repeated according to surplus change data of the disk capacity until the first candidate inflection points cannot be obtained any more.

Wherein, the N satisfies: a total number of sampling moments in the change data of the disk capacity=2N+1, and N is a positive integer.

By way of an example, in the embodiment of the present disclosure, the method of obtaining the target inflection point in the historical capacity data according to the first candidate inflection point detected by each detection algorithm may comprise but not limited to: first, obtaining a second inflection point according to the first candidate inflection point detected by each detection algorithm. Then, the second candidate inflection point at the latest sampling moment is obtained as a target inflection point in the historical capacity data.

In a specific implementation procedure, the method of obtaining a second inflection point according to the first candidate inflection point detected by each detection algorithm may comprise but not limited to:

The first method: merging the first candidate inflection points detected by at least two detection algorithms to obtain the second candidate inflection point.

The second method: obtaining an intersection of the first candidate inflection points detected by at least two detection algorithms, as the second candidate inflection point.

The third method: inputting the first candidate inflection point detected by each detection algorithm into a preset inflection point recognition model so that the inflection point recognition model performs recognition for the input first candidate inflection point. If the inflection point recognition model recognizes that the first candidate inflection point is an inflection point, the first candidate inflection point may be regarded as the second candidate inflection point. On the contrary, if the inflection point recognition model recognizes that the first candidate inflection point is not an inflection point, the first candidate inflection point may not be regarded as the second candidate inflection point.

Optionally, the inflection point recognition model may be obtained by performing machine learning for an inflection point training sample, and will not be detailed herein in the embodiment of the present disclosure.

It may be appreciated that only prediction of the disk capacity for the last inflection point is meaningful. Therefore, after the second candidate inflection points are obtained, the second candidate inflection points are sorted in a temporal sequential order, then the second candidate inflection point at the latest sampling moment therein is obtained, and the second candidate inflection point at the latest sampling moment is regarded as the target point in the historical capacity data.

In the embodiment of the present disclosure, the inflection point refers to a moment when data written into the disk of the cluster changes in essence. For example, 30% data are written into the disk of cluster A, and 70% data are written into the disk of cluster B, then 50% data are respectively written into the disk of the cluster A and disk of the cluster B at a certain moment t, then the moment t may be an inflection point.

In a specific implementation procedure, after the target inflection point of the historical capacity data is obtained, a linear relationship between the time and disk capacity is obtained according to the historical capacity data after the target inflection point.

By way of an example, in the embodiment of the present disclosure, the method of a obtain the linear relationship between the time and disk capacity according to the historical capacity data after the target inflection point may comprise but not limited to: performing linear fitting processing for the historical capacity data after the target inflection point to obtain the linear relationship between the time and disk capacity.

It may be appreciated that the disk capacity after the target inflection point should be stable and complies with linear characteristics. Hence, in the embodiment of the present disclosure, the historical capacity data after the target inflection point may be input into a data fitting algorithm so that the data fitting algorithm performs linear fitting processing for the historical capacity data after the target inflection point, to obtain the linear relationship between the time and disk capacity.

In a specific implementation procedure, the linear relationship between the time and disk capacity may be a parameter of a linear function representing the linear relationship between the time and disk capacity, e.g., a slope k and an intercept b of the linear function. As such, a future trend of the disk capacity may be predicted relatively accurately according to the linear relationship between the time and disk capacity, to obtain the disk capacity at a certain future moment.

Embodiments of the present disclosure further provide an apparatus implementation for implementing steps and methods in the above method embodiments.

Figure 2:
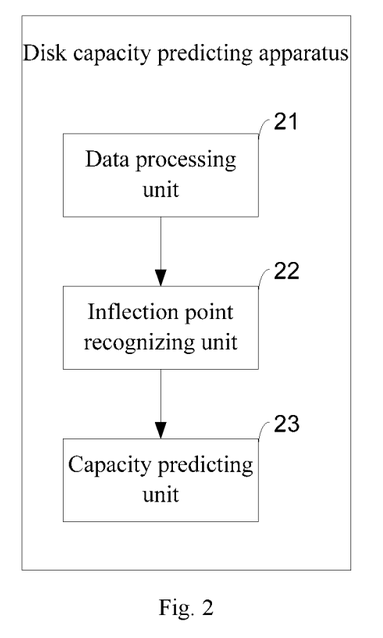
FIG. 2 is a block diagram of embodiment 1 of a disk capacity predicting apparatus according to an embodiment of the present disclosure.

Referring to FIG. 2, it is a block diagram of embodiment 1 of a disk capacity predicting apparatus according to an embodiment of the present disclosure. As shown in the figure, the apparatus comprises:

a data processing unit 21 configured to obtain change data of a disk capacity according to historical capacity data of the disk;

an inflection point recognizing unit 22 configured to obtain a target inflection point in the historical capacity data according to the change data of the disk capacity;

a capacity predicting unit 23 configured to obtain a linear relationship between time and the disk capacity according to the historical capacity data after the target inflection point.

Figure 3:
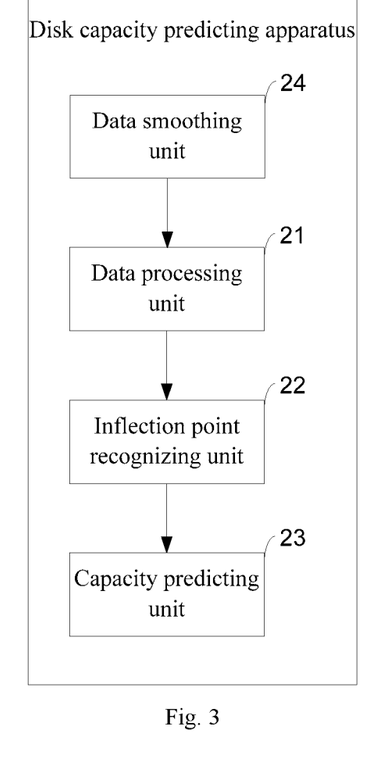
FIG. 3 is a block diagram of embodiment 2 of a disk capacity predicting apparatus according to an embodiment of the present disclosure.

FIG. 3 is a block diagram of embodiment 2 of a disk capacity predicting apparatus according to an embodiment of the present disclosure. As shown in the figure, the apparatus further comprises:

a data smoothing unit 24 configured to perform data smoothing processing for the historical capacity data of the disk.

In a specific implementation procedure, the historical capacity data comprise at least one sampling moment and a disk capacity at each sampling moment; the data processing unit 21 is specifically configured to:

obtain a disk capacity speed at each sampling moment in said at least on sampling moment according to the disk capacity at said at least one sampling moment, as the change data of the disk capacity; or obtain a disk capacity acceleration at each sampling moment in said at least on sampling moment according to the disk capacity at said at least one sampling moment, as the change data of the disk capacity.

In a specific implementation procedure, the inflection point recognizing unit 22 is specifically configured to:

use at least two detection algorithms to respectively detect the change data of the disk capacity, to obtain a first candidate inflection point detected by each detection algorithm;

obtain a target inflection point in the historical capacity data according to the first candidate inflection point detected by each detection algorithm.

In a specific implementation procedure, upon obtaining a target inflection point in the historical capacity data according to the first candidate inflection point detected by each detection algorithm, said inflection point recognizing unit 22 is specifically configured to:

obtain a second inflection point according to the first candidate inflection point detected by each detection algorithm, obtain the second candidate inflection point at the latest sampling moment as a target inflection point in the historical capacity data.

In a specific implementation procedure, the capacity predicting unit 23 is specifically configured to: perform linear fitting processing for the historical capacity data after the target inflection point to obtain the linear relationship between the time and disk capacity.

Since the units in the present embodiment can execute the method shown in FIG. 1, reference may be made to related depictions of FIG. 1 for portions of the present embodiment not described in detail.

Technical solutions of embodiments of the present disclosure have the following advantageous effects:

In the embodiments of the present disclosure, the change data of the disk capacity is obtained according to the historical capacity data of the disk; then the target inflection point in the historical capacity data is obtained according to the change data of the disk capacity; and then the linear relationship between the time and disk capacity is obtained according to the historical capacity data after the target inflection point.

Technical solutions provided by embodiments of the present disclosure can automatically predict the trend of the disk capacity according to the historical capacity data of the disk. As compared with manual prediction of disk capacity trend in the prior art, technical solutions provided by embodiments of the present disclosure can achieve improvement of accuracy of prediction of disk capacity trend, thereby avoiding problems to the effect that the disk capacity, after capacity being increased, cannot satisfy the demand, or redundancy and waste of the disk capacity is caused after the capacity is increased, and thereby reducing manpower cost needed in disk capacity prediction.

Those skilled in the art may clearly appreciate that for the sake of convenient and brief depictions, specific operation procedures of the above-mentioned system, apparatus and units will not be described in detail any longer and reference may be made to corresponding procedures in the aforesaid method embodiments.

In the embodiments of the present disclosure, it should be understood that the system, apparatus and method disclosed can be implemented through other ways. For example, the apparatus embodiments described above are only illustrative e.g., the division of the units is merely logical one, and, in reality, they can be divided in other ways. For example, a plurality of units or components may be combined or integrated into another system, or some features may be neglected or not executed. In addition, mutual coupling or direct coupling or communication connection as displayed or discussed may be performed via some interfaces, and indirect coupling or communication connection of means or units may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be realized as hardware, or they can be realized with hardware and software functional unit.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

The foregoing is only example embodiments of the present disclosure, not intended to limit the disclosure. Any modifications, equivalent replacements, improvements and the like made within the spirit and principles of the present disclosure, should all be included in the present disclosure within the scope of protection.

What is claimed is:

1. A disk capacity predicting method, comprising:
   obtaining change data of a disk capacity according to historical capacity data of the disk;
   obtaining a target inflection point in the historical capacity data according to the change data of the disk capacity; and
   obtaining a linear relationship between time and the disk capacity according to the historical capacity data after the target inflection point,
   wherein the obtaining a target inflection point in the historical capacity data according to the change data of the disk capacity comprises:
      using at least two detection algorithms to respectively detect the change data of the disk capacity, to obtain a first candidate inflection point detected by each detection algorithm;
      obtaining second inflection points according to the first candidate inflection point detected by each detection algorithm; and
      obtaining a second candidate inflection point at a latest sampling moment from the second candidate inflection points, as a target inflection point in the historical capacity data.

2. The method according to claim 1, wherein before obtaining change data of a disk capacity according to historical capacity data of the disk, the method further comprises:
   performing data smoothing processing for the historical capacity data of the disk.

3. The method according to claim 2, wherein the historical capacity data comprise at least one sampling moment and a disk capacity at each sampling moment; the obtaining the change data of a disk capacity according to historical capacity data of the disk comprises:
   obtaining a disk capacity speed at each sampling moment in said at least one sampling moment according to the disk capacity at said at least one sampling moment, as the change data of the disk capacity; or
   obtaining a disk capacity acceleration at each sampling moment in said at least one sampling moment according to the disk capacity at said at least one sampling moment, as the change data of the disk capacity.

4. The method according to claim 1, wherein the historical capacity data comprise at least one sampling moment and a disk capacity at each sampling moment; the obtaining the change data of a disk capacity according to historical capacity data of the disk comprises:
   obtaining a disk capacity speed at each sampling moment in said at least one sampling moment according to the disk capacity at said at least one sampling moment, as the change data of the disk capacity; or
   obtaining a disk capacity acceleration at each sampling moment in said at least one sampling moment according to the disk capacity at said at least one sampling moment, as the change data of the disk capacity.

5. The method according to claim 1, wherein the obtaining a linear relationship between time and the disk capacity according to the historical capacity data after the target inflection point comprises:
   performing linear fitting processing for the historical capacity data after the target inflection point to obtain the linear relationship between the time and disk capacity.

6. A disk capacity predicting apparatus, comprising:
a data processing unit configured to obtain change data of a disk capacity according to historical capacity data of the disk;
an inflection point recognizing unit configured to obtain a target inflection point in the historical capacity data according to the change data of the disk capacity; and
a capacity predicting unit configured to obtain a linear relationship between time and the disk capacity according to the historical capacity data after the target inflection point,
wherein the inflection point recognizing unit is configured to:
use at least two detection algorithms to respectively detect the change data of the disk capacity, to obtain a first candidate inflection point detected by each detection algorithm;
obtain second candidate inflection points according to the first candidate inflection point detected by each detection algorithm; and
obtain a second candidate inflection points at a latest sampling moment from the second candidate inflection points, as a target inflection point in the historical capacity data.

7. The apparatus according to claim 6, wherein the apparatus further comprises:
a data smoothing unit configured to perform data smoothing processing for the historical capacity data of the disk.

8. The apparatus according to claim 7, wherein the historical capacity data comprise at least one sampling moment and a disk capacity at each sampling moment; the data processing unit is configured to:
obtain a disk capacity speed at each sampling moment in said at least one sampling moment according to the disk capacity at said at least one sampling moment, as the change data of the disk capacity; or
obtain a disk capacity acceleration at each sampling moment in said at least one sampling moment according to the disk capacity at said at least one sampling moment, as the change data of the disk capacity.

9. The apparatus according to claim 6, wherein the historical capacity data comprise at least one sampling moment and a disk capacity at each sampling moment; the data processing unit is configured to:
obtain a disk capacity speed at each sampling moment in said at least one sampling moment according to the disk capacity at said at least one sampling moment, as the change data of the disk capacity; or
obtain a disk capacity acceleration at each sampling moment in said at least one sampling moment according to the disk capacity at said at least one sampling moment, as the change data of the disk capacity.

10. The apparatus according to claim 6, wherein the capacity predicting unit is configured to:
perform linear fitting processing for the historical capacity data after the target inflection point to obtain the linear relationship between the time and disk capacity.

11. An apparatus, comprising:
a memory, which in operation stores one or more programs; and
one or more processors coupled to the memory, wherein the one or more processors, in operation, execute the one or more programs to:
obtain change data of a disk capacity according to historical capacity data of the disk;
obtain a target inflection point in the historical capacity data according to the change data of the disk capacity; and
obtain a linear relationship between time and the disk capacity according to the historical capacity data after the target inflection point,
wherein the obtaining a target inflection point in the historical capacity data according to the change data of the disk capacity comprises:
using at least two detection algorithms to respectively detect the change data of the disk capacity, to obtain a first candidate inflection point detected by each detection algorithm;
obtaining second candidate inflection points according to the first candidate inflection point detected by each detection algorithm; and
obtaining a second candidate inflection point at a latest sampling moment from the second candidate inflection points, as a target inflection point in the historical capacity data.

12. A non-transitory computer-readable medium having contents which configure a processing apparatus to perform a method, the method comprising:
obtaining change data of a disk capacity according to historical capacity data of the disk;
obtaining a target inflection point in the historical capacity data according to the change data of the disk capacity; and
obtaining a linear relationship between time and the disk capacity according to the historical capacity data after the target inflection point,
wherein the obtaining a target inflection point in the historical capacity data according to the change data of the disk capacity comprises:
using at least two detection algorithms to respectively detect the change data of the disk capacity, to obtain a first candidate inflection point detected by each detection algorithm;
obtaining second candidate inflection points according to the first candidate inflection point detected by each detection algorithm; and
obtaining a second candidate inflection point at a latest sampling moment from the second candidate inflection points, as a target inflection point in the historical capacity data.

* * * * *